(12) United States Patent
Bertrand et al.

(10) Patent No.: US 9,457,901 B2
(45) Date of Patent: Oct. 4, 2016

(54) QUADCOPTER WITH A PRINTABLE PAYLOAD EXTENSION SYSTEM AND METHOD

(71) Applicants: Blaise Bertrand, San Francisco, CA (US); Youenn Colin, San Francisco, CA (US); Anthony Patron, Mountain View, CA (US); Vinh Pho, Oakland, CA (US)

(72) Inventors: Blaise Bertrand, San Francisco, CA (US); Youenn Colin, San Francisco, CA (US); Anthony Patron, Mountain View, CA (US); Vinh Pho, Oakland, CA (US)

(73) Assignee: FATDOOR, INC., Mountain View, CA (US)

( * ) Notice: Subject to any disclaimer, the term of this patent is extended or adjusted under 35 U.S.C. 154(b) by 231 days.

(21) Appl. No.: 14/258,044

(22) Filed: Apr. 22, 2014

(65) Prior Publication Data

US 2015/0298799 A1  Oct. 22, 2015

(51) Int. Cl.
| | | |
|---|---|---|
| *B64C 27/20* | (2006.01) | |
| *B64C 39/02* | (2006.01) | |
| *B33Y 80/00* | (2015.01) | |
| *A63H 27/00* | (2006.01) | |

(52) U.S. Cl.
CPC .............. *B64C 39/024* (2013.01); *A63H 27/12* (2013.01); *B33Y 80/00* (2014.12); *B64C 27/20* (2013.01); *B64C 2201/027* (2013.01); *B64C 2201/042* (2013.01); *B64C 2201/127* (2013.01)

(58) Field of Classification Search
CPC . B64C 27/08; B64C 27/20; B64C 2201/024; B64C 2201/27; B64C 2201/108; B64C 27/32; A63H 27/12
See application file for complete search history.

(56) References Cited

U.S. PATENT DOCUMENTS

| | | |
|---|---|---|
| 2,035,218 A | 3/1936 | Bloom |
| 3,253,806 A | 5/1966 | Eickmann |

(Continued)

FOREIGN PATENT DOCUMENTS

| | | |
|---|---|---|
| EP | 1426876 A1 | 6/2004 |
| EP | 1901153 A1 | 3/2008 |

(Continued)

OTHER PUBLICATIONS http://www.zdnetcom/news/perspective-social-networking-for-all/149441.

(Continued)

*Primary Examiner* — Joseph W Sanderson
*Assistant Examiner* — Magdalena Topolski
(74) *Attorney, Agent, or Firm* — Raj Abhyanker, P.C.

(57) ABSTRACT

A method and system of printable payload extensions of a quadcopter are disclosed. In one aspect, a quadcopter includes an airframe and a central portion of the airframe having at least one of an upper extender mechanism and a lower extender mechanism. The central portion enables users of the quadcopter to design payload extensions that mechanically couple with the quadcopter using a three-dimensional (3D) printing device as long as the payload extensions have a weight less than a maximum payload capacity of the quadcopter. The quadcopter couples with at a set of payload extensions including a hook assembly, an interlocking building block platform assembly, a DSLR camera assembly, a HD camera assembly, and/or a container assembly through the central portion of the airframe.

5 Claims, 8 Drawing Sheets

(56) References Cited

U.S. PATENT DOCUMENTS

| | | |
|---|---|---|
| 3,556,438 A | 1/1971 | Meditz |
| 3,762,669 A | 10/1973 | Curci |
| 4,119,163 A | 10/1978 | Ball |
| 4,161,843 A | 7/1979 | Hui |
| 4,375,354 A | 3/1983 | Henriksson |
| 4,556,198 A | 12/1985 | Tominaga |
| 4,779,203 A | 10/1988 | McClure et al. |
| 4,914,605 A | 4/1990 | Loughmiller, Jr. et al. |
| 4,996,468 A | 2/1991 | Field et al. |
| 5,032,989 A | 7/1991 | Tornetta |
| 5,050,844 A | 9/1991 | Hawk |
| 5,199,686 A | 4/1993 | Fletcher |
| 5,208,750 A | 5/1993 | Kurami et al. |
| 5,325,294 A | 6/1994 | Keene |
| 5,372,211 A | 12/1994 | Wilcox et al. |
| 5,521,817 A | 5/1996 | Burdoin et al. |
| 5,577,567 A | 11/1996 | Johnson et al. |
| 5,581,630 A | 12/1996 | Bonneau, Jr. |
| 5,584,025 A | 12/1996 | Keithley et al. |
| 5,590,062 A | 12/1996 | Nagamitsu et al. |
| 5,617,319 A | 4/1997 | Arakawa et al. |
| 5,630,103 A | 5/1997 | Smith et al. |
| 5,671,342 A | 9/1997 | Millier et al. |
| 5,720,363 A | 2/1998 | Kipp |
| 5,751,245 A | 5/1998 | Janky et al. |
| 5,774,133 A | 6/1998 | Neave et al. |
| 5,794,207 A | 8/1998 | Walker et al. |
| 5,805,810 A | 9/1998 | Maxwell |
| 5,819,269 A | 10/1998 | Uomini |
| 5,826,244 A | 10/1998 | Huberman |
| 5,831,664 A | 11/1998 | Wharton et al. |
| 5,835,896 A | 11/1998 | Fisher et al. |
| 5,852,810 A | 12/1998 | Sotiroff et al. |
| 5,904,214 A | 5/1999 | Lin |
| 5,905,499 A | 5/1999 | McDowall et al. |
| 5,907,322 A | 5/1999 | Kelly et al. |
| 5,926,765 A | 7/1999 | Sasaki |
| 5,930,474 A | 7/1999 | Dunworth et al. |
| 5,937,413 A | 8/1999 | Hyun et al. |
| 5,940,806 A | 8/1999 | Danial |
| 5,991,737 A | 11/1999 | Chen |
| 6,024,288 A | 2/2000 | Gottlich et al. |
| 6,029,141 A | 2/2000 | Bezos et al. |
| 6,029,195 A | 2/2000 | Herz |
| 6,034,618 A | 3/2000 | Tatebayashi et al. |
| 6,036,601 A | 3/2000 | Heckel |
| 6,047,194 A | 4/2000 | Andersson |
| 6,047,236 A | 4/2000 | Hancock et al. |
| 6,049,778 A | 4/2000 | Walker et al. |
| 6,059,263 A | 5/2000 | Otema et al. |
| 6,073,138 A | 6/2000 | de l'Etraz et al. |
| 6,078,906 A | 6/2000 | Huberman |
| 6,088,702 A | 7/2000 | Plantz et al. |
| 6,092,076 A | 7/2000 | McDonough et al. |
| 6,092,105 A | 7/2000 | Goldman |
| 6,101,484 A | 8/2000 | Halbert et al. |
| 6,108,639 A | 8/2000 | Walker et al. |
| 6,122,592 A | 9/2000 | Arakawa et al. |
| 6,134,486 A | 10/2000 | Kanayama |
| 6,148,260 A | 11/2000 | Musk et al. |
| 6,148,289 A | 11/2000 | Virdy |
| 6,175,831 B1 | 1/2001 | Weinreich et al. |
| 6,199,076 B1 | 3/2001 | Logan et al. |
| 6,229,533 B1 | 5/2001 | Farmer et al. |
| 6,236,990 B1 | 5/2001 | Geller et al. |
| 6,269,369 B1 | 7/2001 | Robertson |
| 6,308,177 B1 | 10/2001 | Israni et al. |
| 6,317,718 B1 | 11/2001 | Fano |
| 6,336,111 B1 | 1/2002 | Ashby et al. |
| 6,339,745 B1 | 1/2002 | Novik |
| 6,356,834 B2 | 3/2002 | Hancock et al. |
| 6,381,537 B1 | 4/2002 | Chenault et al. |
| 6,401,085 B1 | 6/2002 | Gershman et al. |
| 6,405,123 B1 | 6/2002 | Rennard et al. |
| 6,408,307 B1 | 6/2002 | Semple et al. |
| 6,445,983 B1 | 9/2002 | Dickson et al. |
| 6,453,339 B1 | 9/2002 | Schultz et al. |
| 6,470,268 B1 | 10/2002 | Ashcraft et al. |
| 6,480,885 B1 | 11/2002 | Olivier |
| 6,487,583 B1 | 11/2002 | Harvey et al. |
| 6,498,982 B2 | 12/2002 | Bellesfield et al. |
| 6,507,776 B1 | 1/2003 | Fox, III |
| 6,513,069 B1 | 1/2003 | Abato et al. |
| 6,519,629 B2 | 2/2003 | Harvey et al. |
| 6,532,007 B1 | 3/2003 | Matsuda |
| 6,542,813 B1 | 4/2003 | Kovacs |
| 6,542,817 B2 | 4/2003 | Miyaki |
| 6,542,936 B1 | 4/2003 | Mayle et al. |
| 6,557,013 B1 | 4/2003 | Ziff et al. |
| 6,587,787 B1 | 7/2003 | Yokota |
| 6,597,983 B2 | 7/2003 | Hancock |
| 6,600,418 B2 | 7/2003 | Francis et al. |
| 6,611,751 B2 | 8/2003 | Warren |
| 6,615,039 B1 | 9/2003 | Eldering |
| 6,622,086 B2 | 9/2003 | Polidi |
| 6,629,136 B1 | 9/2003 | Naidoo |
| 6,633,311 B1 | 10/2003 | Douvikas et al. |
| 6,636,803 B1 | 10/2003 | Hartz, Jr. et al. |
| 6,640,187 B1 | 10/2003 | Chenault et al. |
| 6,643,663 B1 | 11/2003 | Dabney et al. |
| 6,646,568 B2 | 11/2003 | MacPhail et al. |
| 6,647,383 B1 | 11/2003 | August et al. |
| 6,654,800 B1 | 11/2003 | Rieger, III |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,684,196 B1 | 1/2004 | Mini et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,907,405 B2 | 6/2005 | Brett |
| 6,918,576 B2 | 7/2005 | Finkbeiner |
| 6,926,233 B1 | 8/2005 | Corcoran, III |
| 6,931,419 B1 | 8/2005 | Lindquist |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B2 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,050,909 B2 | 5/2006 | Nichols et al. |
| 7,068,309 B2 | 6/2006 | Toyama et al. |
| 7,069,308 B2 | 6/2006 | Abrams |
| 7,072,849 B1 | 7/2006 | Filepp et al. |
| 7,076,409 B2 | 7/2006 | Agrawala et al. |
| 7,076,741 B2 | 7/2006 | Miyaki |
| 7,079,943 B2 | 7/2006 | Flann et al. |
| 7,080,019 B1 | 7/2006 | Hurzeler |

(56) References Cited

U.S. PATENT DOCUMENTS

| | | |
|---|---|---|
| 7,080,096 B1 | 7/2006 | Imamura |
| 7,085,650 B2 | 8/2006 | Anderson |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger, III |
| 7,155,336 B2 | 12/2006 | Dorfman et al. |
| 7,158,878 B2 | 1/2007 | Rasmussen et al. |
| 7,174,301 B2 | 2/2007 | Florance et al. |
| 7,177,872 B2 | 2/2007 | Schwesig et al. |
| 7,178,720 B1 | 2/2007 | Strubbe et al. |
| 7,184,990 B2 | 2/2007 | Walker et al. |
| 7,188,056 B2 | 3/2007 | Kagarlis |
| 7,188,080 B1 | 3/2007 | Walker et al. |
| 7,188,153 B2 | 3/2007 | Lunt et al. |
| 7,209,803 B2 | 4/2007 | Okamoto et al. |
| 7,218,993 B2 | 5/2007 | Yasukawa et al. |
| 7,228,232 B2 | 6/2007 | Bodin et al. |
| 7,233,942 B2 | 6/2007 | Nye |
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,254,559 B2 | 8/2007 | Florance et al. |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | DiStefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,702,545 B1 | 4/2010 | Compton et al. |
| 7,725,492 B2 | 5/2010 | Sittig et al. |
| 7,734,254 B2 | 6/2010 | Frost et al. |
| 7,751,971 B2 | 7/2010 | Chang et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 | 11/2010 | Zhong |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,703 B1 | 8/2011 | Watkins |
| 7,996,109 B2 | 8/2011 | Zini et al. |
| 7,996,270 B2 | 8/2011 | Sundaresan |
| 8,010,230 B2 | 8/2011 | Zini et al. |
| 8,027,943 B2 | 9/2011 | Juan et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,095,430 B2 | 1/2012 | Abhyanker |
| 8,103,734 B2 | 1/2012 | Galli et al. |
| 8,107,879 B2 | 1/2012 | Pering et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,661 B1 | 3/2012 | Billman et al. |
| 8,145,703 B2 | 3/2012 | Frishert et al. |
| 8,149,113 B2 | 4/2012 | Diem |
| 8,167,234 B1 | 5/2012 | Moore |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |

(56) References Cited

U.S. PATENT DOCUMENTS

| | | |
|---|---|---|
| 8,195,601 B2 | 6/2012 | Law et al. |
| 8,195,744 B2 | 6/2012 | Julia et al. |
| 8,204,624 B2 | 6/2012 | Zini et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,326,091 B1 | 12/2012 | Jing et al. |
| 8,326,315 B2 | 12/2012 | Phillips et al. |
| 8,328,130 B2 | 12/2012 | Goossen |
| 8,352,183 B2 | 1/2013 | Thota et al. |
| 8,364,757 B2 | 1/2013 | Scott et al. |
| 8,370,003 B2 | 2/2013 | So et al. |
| 8,380,382 B2 | 2/2013 | Sung et al. |
| 8,380,638 B1 | 2/2013 | Watkins |
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,504,284 B2 | 8/2013 | Brülle-Drews et al. |
| 8,504,512 B2 | 8/2013 | Herzog et al. |
| 8,510,268 B1 | 8/2013 | Laforge et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 | 12/2013 | McAndrew et al. |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,626,699 B2 | 1/2014 | Xie et al. |
| 8,627,506 B2 | 1/2014 | Vera et al. |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,660,897 B2 | 2/2014 | Abhyanker |
| 8,666,660 B2 | 3/2014 | Sartipi et al. |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,091 B1 | 5/2014 | Abhyanker |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,738,545 B2 | 5/2014 | Abhyanker |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,825,226 B1 | 9/2014 | Worley, III et al. |
| 8,832,556 B2 | 9/2014 | Steinberg |
| 2001/0005829 A1 | 6/2001 | Raveis |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0033176 A1 | 2/2003 | Hancock |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |

(56) References Cited

U.S. PATENT DOCUMENTS

| | | |
|---|---|---|
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0002871 A1 | 1/2004 | Geranio |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0039581 A1 | 2/2004 | Wheeler |
| 2004/0054428 A1 | 3/2004 | Sheha et al. |
| 2004/0056762 A1 | 3/2004 | Rogers |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino et al. |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058921 A1 | 3/2006 | Okamoto |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell |
| 2006/0125616 A1 | 6/2006 | Song |
| 2006/0136127 A1 | 6/2006 | Coch et al. |
| 2006/0136419 A1 | 6/2006 | Brydon et al. |

(56) References Cited

U.S. PATENT DOCUMENTS

| | | |
|---|---|---|
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1 | 9/2006 | Lyon |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112461 A1 | 5/2007 | Zini et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219659 A1 | 9/2007 | Abhyanker et al. |
| 2007/0219712 A1 | 9/2007 | Abhyanker |
| 2007/0220174 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1 | 10/2007 | Abhyanker |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | DaCosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |

(56) References Cited

U.S. PATENT DOCUMENTS

| | | |
|---|---|---|
| 2008/0077464 A1 | 3/2008 | Gottlieb et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1 | 4/2008 | Jhanji |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1 | 7/2008 | Murphy et al. |
| 2008/0162211 A1 | 7/2008 | Addington |
| 2008/0162260 A1 | 7/2008 | Rohan et al. |
| 2008/0167771 A1 | 7/2008 | Whittaker et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0228719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243378 A1 | 10/2008 | Zavoli |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018850 A1 | 1/2009 | Abhyanker |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0282353 A1 | 11/2009 | Halbherr et al. |
| 2009/0283629 A1* | 11/2009 | Kroetsch ............... A63H 27/12 244/17.23 |
| 2009/0284530 A1 | 11/2009 | Lester et al. |
| 2009/0287682 A1 | 11/2009 | Fujioka et al. |
| 2009/0299551 A1 | 12/2009 | So et al. |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0070075 A1 | 3/2010 | Chirnomas |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082683 A1 | 4/2010 | Law et al. |
| 2010/0083125 A1 | 4/2010 | Zafar et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |

(56) References Cited

U.S. PATENT DOCUMENTS

| | | |
|---|---|---|
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0255899 A1 | 10/2010 | Paulsen |
| 2010/0275033 A1 | 10/2010 | Gillespie et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1 | 7/2011 | Zini et al. |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0126974 A1 | 5/2012 | Phillips et al. |
| 2012/0138732 A1 | 6/2012 | Olm et al. |
| 2012/0163206 A1 | 6/2012 | Leung et al. |
| 2012/0166935 A1 | 6/2012 | Abhyanker |
| 2012/0191606 A1 | 7/2012 | Milne |
| 2012/0191797 A1 | 7/2012 | Masonis et al. |
| 2012/0209775 A1 | 8/2012 | Milne |
| 2012/0221470 A1 | 8/2012 | Lyon |
| 2012/0224076 A1 | 9/2012 | Niedermeyer et al. |
| 2012/0232958 A1 | 9/2012 | Silbert |
| 2012/0239483 A1 | 9/2012 | Yankovich et al. |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0331002 A1 | 12/2012 | Carrington |
| 2013/0005307 A1 | 1/2013 | Kim et al. |
| 2013/0024108 A1 | 1/2013 | Grün |
| 2013/0041761 A1 | 2/2013 | Voda |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0080217 A1 | 3/2013 | Abhyanker |
| 2013/0103437 A1 | 4/2013 | Nelson |
| 2013/0105635 A1 | 5/2013 | Alzu'bi et al. |
| 2013/0110631 A1 | 5/2013 | Mitchell et al. |
| 2013/0151455 A1 | 6/2013 | Odom et al. |
| 2013/0159127 A1 | 6/2013 | Myslinski |
| 2013/0204437 A1 | 8/2013 | Koselka et al. |
| 2013/0206915 A1* | 8/2013 | Desaulniers .......... B64C 39/024 244/165 |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Fuste Vilella et al. |
| 2013/0303197 A1 | 11/2013 | Chandra et al. |
| 2013/0317999 A1 | 11/2013 | Zimberoff et al. |
| 2014/0032034 A1 | 1/2014 | Raptopoulos et al. |
| 2014/0040179 A1 | 2/2014 | Herzog et al. |
| 2014/0067167 A1 | 3/2014 | Levien et al. |
| 2014/0067704 A1 | 3/2014 | Abhyanker |
| 2014/0074736 A1 | 3/2014 | Carrington |
| 2014/0081450 A1 | 3/2014 | Kuehnrich et al. |
| 2014/0087780 A1 | 3/2014 | Abhyanker et al. |
| 2014/0095293 A1 | 4/2014 | Abhyanker |
| 2014/0099853 A1* | 4/2014 | Condon ................. A63F 13/00 446/37 |
| 2014/0100900 A1 | 4/2014 | Abhyanker |
| 2014/0108540 A1 | 4/2014 | Crawford |
| 2014/0108556 A1 | 4/2014 | Abhyanker |
| 2014/0108613 A1 | 4/2014 | Randall |
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0135039 A1 | 5/2014 | Sartipi et al. |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1 | 6/2014 | Abhyanker et al. |
| 2014/0204360 A1 | 7/2014 | Dowski, Jr. et al. |
| 2014/0222908 A1 | 8/2014 | Park et al. |
| 2014/0254896 A1 | 9/2014 | Zhou et al. |
| 2014/0277634 A1 | 9/2014 | Levien et al. |
| 2014/0316243 A1 | 10/2014 | Niedermeyer |
| 2015/0225071 A1* | 8/2015 | Tighe .................... B64C 29/02 244/12.4 |
| 2015/0259066 A1* | 9/2015 | Johannesson .......... B64C 27/08 244/17.27 |

FOREIGN PATENT DOCUMENTS

| | | | |
|---|---|---|---|
| FR | WO2013/144508 | * | 10/2010 |
| FR | WO2011/058255 | * | 5/2011 |
| KR | 101069834 B1 | | 10/2010 |
| KR | 1020120121376 A | | 7/2012 |
| WO | 9808055 A1 | | 2/1998 |
| WO | 9956143 A1 | | 11/1999 |
| WO | 0054170 A2 | | 9/2000 |
| WO | 0163423 A1 | | 8/2001 |
| WO | 0201455 A2 | | 1/2002 |
| WO | 0219236 A1 | | 3/2002 |
| WO | 0241115 A2 | | 5/2002 |
| WO | 03058540 A1 | | 7/2003 |
| WO | 2005103624 A2 | | 11/2005 |
| WO | 2006020471 A1 | | 2/2006 |
| WO | 2007108927 A2 | | 9/2007 |
| WO | 2007108928 A2 | | 9/2007 |
| WO | 2007113844 A1 | | 10/2007 |
| WO | 2008103149 A1 | | 8/2008 |

(56) References Cited

FOREIGN PATENT DOCUMENTS

| WO | 2008105766 A1 | 9/2008 |
| --- | --- | --- |
| WO | 2008108772 A1 | 9/2008 |
| WO | 2008118119 A1 | 10/2008 |
| WO | 2008123851 A1 | 10/2008 |
| WO | 2008111929 A3 | 11/2008 |
| WO | 2009138559 A1 | 11/2009 |
| WO | 2010103163 A1 | 9/2010 |
| WO | 2011149544 A1 | 12/2011 |
| WO | 2013177059 A1 | 11/2013 |
| WO | 2013188762 A1 | 12/2013 |
| WO | 2014121145 A1 | 8/2014 |

OTHER PUBLICATIONS http://www.remax.com/advancedsearch/.
http://global.remax.com/AdvancedListingSearch.aspx.
http://www.magicbricks.com/property-requirement-to-buy-rent/residential-commercial.
http://www.mapmyindia.com/solutions/tracking-lbs/vehicle-tracking.
http://www.mapmyindia.com/solutions/tracking-lbs/asset-tracking.
http://www.mapmyindia.com/solutions/enterprises/geo-tagging.
http://www.zillow.com/.
http://www.zillow.com/homes/for_rent/.
http://www.zillow.com/homes/for_sale/days_sort/53.409532,-64.072266,19.352611,-129.550781_rect/3_zm/.
http://www.trulia.com/home_prices/.
http://www.trulia.com/for_rent/New_York,NY.
http://www.realtor.com/rentals.
http://www.realtor.com/realestateforsale.
http://www.househunt.com/.
http://www.coldwellbanker.com/real_estate_search;jsessionid=S8ok3kaZtBh5GKHoo-Yzo28Z.sky-node04.
http://www.switchboard.com/.
http://www.anywho.com/whitepages.
http://wp.superpages.com/.
http://www.whitepages.com/.
http://www-personal.umich.edu/~ladamic/papers/socialsearch/adamicsocialsearch.pdf.
http://cs.wellesley.edu/~cs315/315_PPTs/L19-SocialNetworks/Stuff/wellesley.pdf.
http://citeseerx.ist.psu.edu/viewdoc/download?doi=10.1.1.98.5230&rep=rep1&type=pdf.
http://www.ece.lsu.edu/xinli/Research/HeatMap_TVCG06.pdf.
http://www.usa-people-search.com/.
https://www.i-neighbors.org/.
Benchmark-Backed Nextdoor Launches as a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.
Fatdoor Founder Sues Benchmark Capital, Saying it Stole His Idea for Nextdoor, All Things Digital Article, Nov. 11, 2011, by Liz Gannes (7 Pages) http://allthingsd.com/20111111/fatdoor-founder-sues-benchmark-capital-saying-it-stole-his-idea-for-nextdoor/.
Fatdoor CEO Talks About Balancing Security with Community, Wired Magazine, May 31, 2007, by Terrence Russell (2 Pages) http://www.wired.com/2007/05/fatdoor_ceo_tal/.
Fatdoor Launches Social Network for Your Neighborhood, Mashable Article, May 28, 2007, by Kristen Nicole (3 Pages) http://mashable.com/2007/05/28/fatdoor/.
Screenshots of Nextdoor website and its features—as submitted in Case5:14-cv-02335-BLF on Jul. 15, 2014 (pp. 19) http://www.nextdoor.com/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum. screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF Complaint *Fatdoor* v. *Nextdoor*, Northern District of California, with Exhibits A, B and C {Part 1 (pp. 258)} and Exhibits D, E, F, G and H {Part 2 (pp. 222)}, Jul. 15, 2014.
Expert Report—Forensics of Jon Berryhill, Report, *Nextdoor* v. *Abhyanker*, Aug. 8, 2014, by Berryhill Computer forensics Inc. (pp. 23).
Case No. 3:12-cv-05667-EMC Complaint *Nextdoor* v. *Abhyanker*, Northern District of California, Nov. 5, 2012 (pp. 46).
Expert Report—Patent of Jeffrey G. Sheldon, *Nextdoor* v. *Abhyanker*, Aug. 8, 2014 (pp. 7).
Exhibits of Expert Report—Patent of Jeffrey G. Sheldon, *Nextdoor* v. *Abhyanker*, with Attachments A, B, C, D and E (1/2) {Part 1 (pp. 46)} and Attachments E (2/2) and F {Part 2 (pp. 41)}.
Case No. 111-CV-212924 *Abhyanker* v. *Benchmark Capital Partners L.P.*, Superior Court of California, County of Santa Clara, Nov. 10, 2011 (pp. 78) http://www.scribd.com/doc/72441873/Stamped-Complaint-Abhyanker-v-Benchmark-Capital-Et-Al-Filed-Public.
Neighbors Stop Diaper and Formula Thief in his Tracks, Nextdoor Blog, Aug. 15, 2014, by Anne Dreshfield (pp. 12) http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc.* v. *IP Analytics LLC and Google Inc.*, Northern District of California, Aug. 25, 2014, (pp. 16).
Screenshot of Meetey on CrunchBase, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on CrunchBase, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry The Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).

(56) References Cited

OTHER PUBLICATIONS

Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google+ Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
http://pulsosocial.com/en/2014/02/01/3d-printing-graphene-and-quadcopters-a-brave-new-world/.
http://www.thingiverse.com/thing:17612/#instructions.
http://therobotfish.com/projects/quadcopter/.
"Crowdsourcing: Those that are willing to test & learn will be those that will win", Newsline, Mar. 1, 2011 by Neil Perkin http://mediatel.co.uk/newsline/2011/03/01/crowdsourcing-those-that-are-willing-to-test-learn-will-be-those-that-will-win/.
"Friends and Neighbors on the Web", 2001 by Lada A. Adamic et al. (pp. 9) http://www.hpl.hp.com/research/idl/papers/web10/fnn2.pdf.
"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.
"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.
"Direct Annotation: A Drag-and-Drop Strategy for Labeling Photos", University of Maryland, 2000 by Ben Shneiderman et al. (pp. 8) http://hci12.cs.umd.edu/trs/2000-06/2000-06.pdf.
"Notification for Shared Annotation of Digital Documents", Technical Report MSR-TR-2001-87, Sep. 19, 2001 by A. J. Bernheim Brush et al. (pp. 9) http://research.microsoft.com/pubs/69880/tr-2001-87.pdf.
"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.
"Computer Systems and the Design of Organizational Interaction", by Fernando Flores et al. (pp. 20) http://cpe.njit.edu/dlnotes/CIS/CIS735/ComputerSystemsandDesign.pdf.
"ChipIn—the easy way to collect money", Louis' Really Useful Finds, Mar. 12. (p. 1) http://reallyusefulthings.tumblr.com/post/28688782/chipin-the-easy-way-to-collect-money.

* cited by examiner

QUADCOPTER WITH A PRINTABLE PAYLOAD EXTENSION SYSTEM AND METHOD

FIELD OF TECHNOLOGY

This disclosure relates generally to the technical field of mechanical engineering, and in one embodiment, to a method, system and apparatus of a quadcopter with a printable payload extension.

BACKGROUND

Quadcopters may be designed to serve a single purpose. It may be difficult, impractical, and/or dangerous to alter quadcopters to serve additional and/or different purposes. Further, accessories for quadcopters may be limited and/or may require significant work to make the accessories able to attach and/or function on the quadcopter. As a result, the applications of quadcopters may be limited and/or use of quadcopters may become costly and/or unsafe.

SUMMARY

A method and a device of printable payload extensions of a quadcopter are disclosed. In one aspect, a quadcopter includes an airframe and a central portion of the airframe having at least one of an upper extender mechanism and a lower extender mechanism. The central portion includes a connection means that enables users of the quadcopter to design payload extensions that mechanically couple with the quadcopter using a three-dimensional (3D) printing device in conformance with the connection means as long as the payload extensions have a weight less than a maximum payload capacity of the quadcopter. The connection means to couple any of a set of payload extensions including a hook assembly, an interlocking building block platform assembly, a DSLR camera assembly, a HD camera assembly, and a container assembly through the central portion of the airframe.

A first pair of rotors may include of a first rotor and a second rotor physically enclosed in the airframe. An undercarriage may be mechanically coupled on a lower side of the airframe. A second pair of rotors may include of a third rotor and a fourth rotor mechanically coupled to the undercarriage. The second pair of rotors may fold outward with a pivot of the undercarriage in a manner such that the second pair of rotors extend substantially perpendicularly to the first pair of rotors, such that the first rotor may be substantially perpendicular the third rotor and the second rotor is substantially perpendicular the fourth rotor when in an extended mode. The second pair of rotors may fold underneath the first pair of rotors such that the first pair of rotors and the second pair of rotors are substantially parallel to each other in a folded mode of the undercarriage of the quadcopter.

The first pair of rotors may be substantially above the second pair of rotors in the folded mode, such that the first rotor may be substantially above the third rotor and/or the second rotor is substantially above the fourth rotor when in the folded mode. The second pair of rotors may fold outward with the pivot of the undercarriage in the manner such that the second pair of rotors extend substantially perpendicularly to the first pair of rotors, such that the first rotor may be substantially perpendicular the fourth rotor and the second rotor may be substantially perpendicular the third rotor when in the extended mode. The second pair of rotors may extend substantially perpendicularly to the first pair of rotors through a quarter turn of a central axis of the quadcopter coupling the airframe to the undercarriage. The quarter turn may pivot the second set of rotors to the extended mode. The quadcopter may enter a flyable condition when in the extended mode.

The quadcopter may automatically enable an electronic circuitry of the quadcopter when in the flyable condition. The airframe of the quadcopter may include an upper extender mechanism and/or a lower extender mechanism in a central portion of the airframe. The undercarriage may wrap around the lower extender mechanism in a manner such that the lower extender mechanism is enclosed by the undercarriage. The maximum payload capacity may be between one and twenty pounds. The central portion may encompass a cavity in which a securing means may provide for convenient insertion and/or ejection of a battery powering the quadcopter when a cover of the upper extender mechanism is removed.

The cavity may include a processor and/or a memory and/or a communication circuitry comprising at least one of a radio frequency circuitry, a wifi circuitry, and/or a cellular communication circuitry. A pair of fan-out payload extensions may span out from opposing faces of the undercarriage to provide tensile strength during a landing of the quadcopter. The airframe of the quadcopter may include a built-in camera in an encasing of at least one of the first rotor and/or the second rotor of the quadcopter. The airframe may include a return home button to autonomously direct the quadcopter to a predetermined location.

In another aspect, a method of a quadcopter includes enabling users of the quadcopter to design payload extensions that mechanically couple with an airframe of the quadcopter using a three-dimensional (3D) printing device in conformance with a connection means as long as the payload extensions have a weight less than a maximum payload capacity of the quadcopter. Any of a set of payload extensions are coupled through a central portion of an airframe using the connection means. A cavity of the airframe includes a processor and a memory and a communication circuitry comprising at least one of a radio frequency circuitry, a wifi circuitry, and a cellular communication circuitry. The central portion of the airframe has at least one of an upper extender mechanism and a lower extender mechanism.

A second pair of rotors may be folded outward with the pivot of an undercarriage in a manner such that the second pair of rotors extend substantially perpendicularly to a first pair of rotors, such that a first rotor may be substantially perpendicular a third rotor and/or a second rotor may be substantially perpendicular a fourth rotor when in an extended mode. The first pair of rotors comprising of the first rotor and the second rotor may be physically enclosed in the airframe. The undercarriage may be mechanically coupled on a lower side of the airframe. The second pair of rotors comprising of the third rotor and the fourth rotor may be mechanically coupled to the undercarriage. The second pair of rotors may be folded underneath the first pair of rotors such that the first pair of rotors and the second pair of rotors are substantially parallel to each other in a folded mode of the undercarriage of the quadcopter.

The first pair of rotors may be substantially above the second pair of rotors in the folded mode, such that the first rotor is substantially above the third rotor and the second rotor is substantially above the fourth rotor when in the folded mode. The second pair of rotors may fold outward with the pivot of the undercarriage in the manner such that the second pair of rotors extend substantially perpendicularly to the first pair of rotors, such that the first rotor is substantially perpendicular the fourth rotor and the second rotor is substantially perpendicular the third rotor when in the extended mode. The second pair of rotors may be extended substantially perpendicularly to the first pair of rotors through a quarter turn of a central axis of the quadcopter coupling the airframe to the undercarriage. The quarter turn may pivot the second set of rotors to the extended mode. The quadcopter may enter a flyable condition when in the extended mode.

An electronic circuitry of the quadcopter may be automatically enabled when in the flyable condition. The undercarriage may wrap around the lower extender mechanism in a manner such that the lower extender mechanism is enclosed by the undercarriage. The maximum payload capacity may be between one and twenty pounds. A cavity may be encompassed in the central portion in which a securing means to provide for convenient insertion and/or ejection of a battery powering the quadcopter when a cover of the upper extender mechanism is removed. The set of payload extensions may include a hook assembly, an interlocking building block platform assembly, a DSLR camera assembly, a HD camera assembly, and/or a container assembly. A pair of fan-out payload extensions may span out from opposing faces of the undercarriage to provide tensile strength during a landing of the quadcopter. A built-in camera may be included in an encasing of at least one of the first rotor and the second rotor of the quadcopter. A return home button may autonomously direct the quadcopter to a predetermined location.

In yet another aspect, a quadcopter includes an airframe and a central portion of the airframe having an upper extender mechanism and a lower extender mechanism. The central portion includes a connection means that enables users of the quadcopter to design payload extensions that mechanically couple with the quadcopter using a three-dimensional (3D) printing device in conformance with the connection means as long as the payload extensions have a weight of at least one of a weight less than a maximum payload capacity of the quadcopter and a weight equal to the maximum payload capacity of the quadcopter. A second pair of rotors folds underneath a first pair of rotors such that the first pair of rotors and the second pair of rotors are substantially parallel to each other in a folded mode of the quadcopter.

The methods, systems, and apparatuses disclosed herein may be implemented in any means, materials, and forms for achieving various aspects, and some of which may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1A:
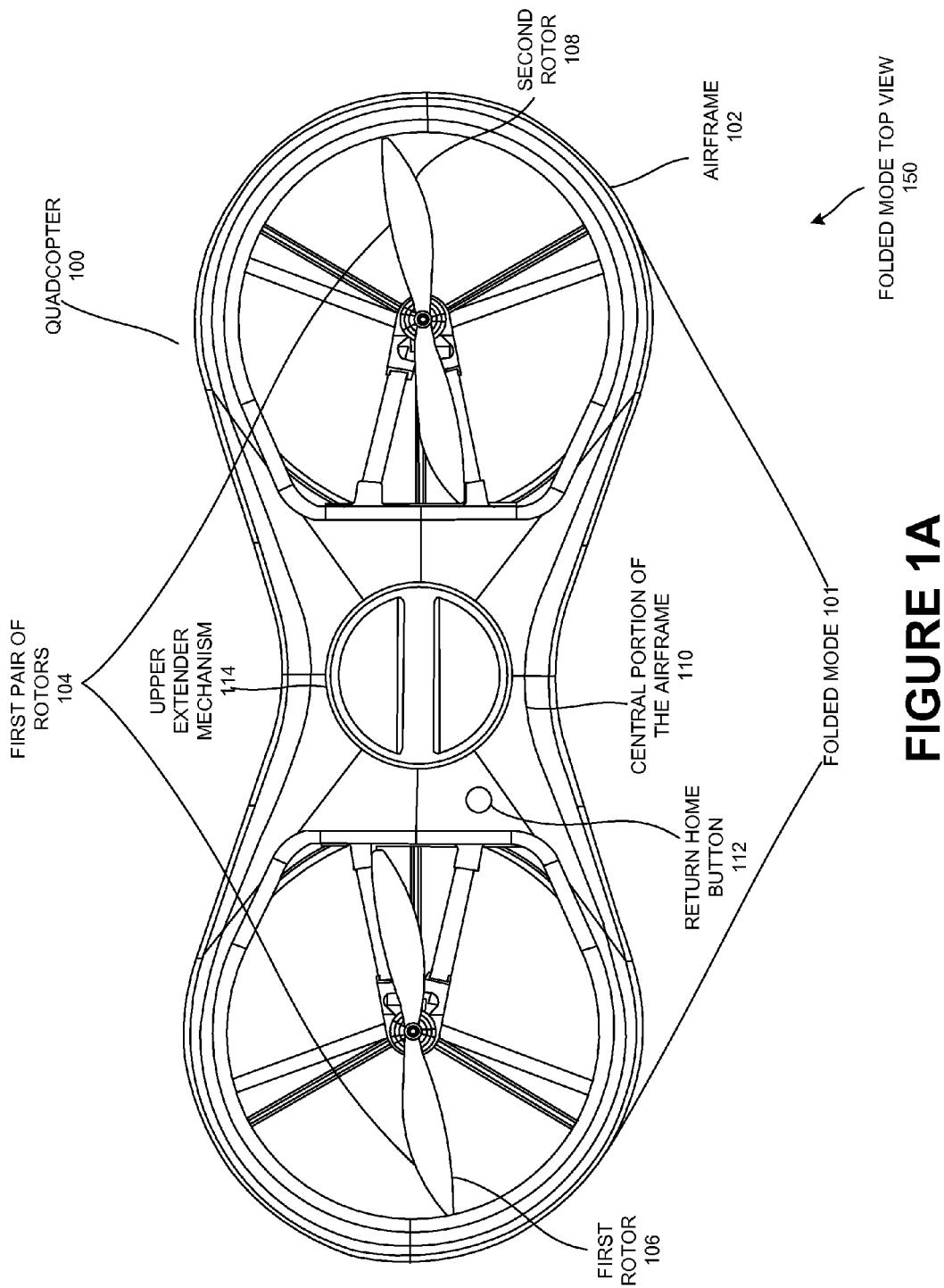
FIG. 1A is a folded mode top view of a quadcopter in a folded mode, according to one embodiment.

Other features of the present embodiments will be apparent from the accompanying drawings and from the detailed description that follows.

DETAILED DESCRIPTION

A method, apparatus and system of printable payload extensions of a quadcopter are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a quadcopter 100 includes an airframe 102 and a central portion of the airframe 110 having at least one of an upper extender mechanism 114 and a lower extender mechanism 124. The central portion includes a connection means 502 that enables users of the quadcopter 100 to design payload extensions that mechanically couple with the quadcopter 100 using a three-dimensional (3D) printing device in conformance with the connection means 502 as long as the payload extensions have a weight less than a maximum payload capacity of the quadcopter 100. The connection means 502 to couple any of a set of payload extensions including a hook assembly 506C, an interlocking building block platform assembly 506A, a DSLR camera assembly, a HD camera assembly 506D, and a container assembly 506B through the central portion of the airframe 110.

A first pair of rotors 104 may include of a first rotor 106 and a second rotor 108 physically enclosed in the airframe 102. An undercarriage 116 may be mechanically coupled on a lower side 202 of the airframe 102. A second pair of rotors 118 may include of a third rotor 120 and a fourth rotor 122 mechanically coupled to the undercarriage 116. The second pair of rotors 118 may fold outward with a pivot 204 of the undercarriage 116 in a manner such that the second pair of rotors 118 extend substantially perpendicularly to the first pair of rotors 104, such that the first rotor 106 may be substantially perpendicular the third rotor 120 and the second rotor 108 is substantially perpendicular the fourth rotor 122 when in an extended mode 300. The second pair of rotors 118 may fold underneath the first pair of rotors 104 such that the first pair of rotors 104 and the second pair of rotors 118 are substantially parallel to each other in a folded mode of the undercarriage 116 of the quadcopter 100.

The first pair of rotors 104 may be substantially above the second pair of rotors 118 in the folded mode, such that the first rotor 106 may be substantially above the third rotor 120 and/or the second rotor 108 is substantially above the fourth rotor 122 when in the folded mode. The second pair of rotors 118 may fold outward with the pivot 204 of the undercarriage 116 in the manner such that the second pair of rotors 118 extend substantially perpendicularly to the first pair of rotors 104, such that the first rotor 106 may be substantially perpendicular the fourth rotor 122 and the second rotor 108 may be substantially perpendicular the third rotor 120 when in the extended mode 300. The second pair of rotors 118 may extend substantially perpendicularly to the first pair of rotors 104 through a quarter turn of a central axis 402 of the quadcopter 100 coupling the airframe 102 to the undercarriage 116. The quarter turn may pivot 204 the second set of rotors to the extended mode 300. The quadcopter 100 may enter a flyable condition 400 when in the extended mode 300.

The quadcopter 100 may automatically enable an electronic circuitry 408 of the quadcopter 100 when in the flyable condition 400. The airframe 102 of the quadcopter 100 may include an upper extender mechanism 114 and/or a lower extender mechanism 124 in a central portion of the airframe 110. The undercarriage 116 may wrap around the lower extender mechanism 124 in a manner such that the lower extender mechanism 124 is enclosed by the undercarriage 116. The maximum payload capacity may be between one and twenty pounds. The central portion may encompass a cavity 602 in which a securing means 606 may provide for convenient insertion and/or ejection of a battery 608 powering the quadcopter 100 when a cover 604 of the upper extender mechanism 114 is removed.

The cavity 602 may include a processor 610 and/or a memory 612 and/or a communication circuitry 614 comprising at least one of a radio frequency circuitry, a wifi circuitry, and/or a cellular communication circuitry 614. A pair of fan-out payload extensions 404 may span out from opposing faces of the undercarriage 116 to provide tensile strength during a landing of the quadcopter 100. The airframe 102 of the quadcopter 100 may include a built-in camera 406 in an encasing of at least one of the first rotor 106 and/or the second rotor 108 of the quadcopter 100. The airframe 102 may include a return home button 112 to autonomously direct the quadcopter 100 to a predetermined location.

In another embodiment, a method of a quadcopter 100 includes enabling users of the quadcopter 100 to design payload extensions that mechanically couple with an airframe 102 of the quadcopter 100 using a three-dimensional (3D) printing device in conformance with a connection means 502 as long as the payload extensions have a weight less than a maximum payload capacity of the quadcopter 100. Any of a set of payload extensions are coupled through a central portion of an airframe 102 using the connection means 502. A cavity 602 of the airframe 102 includes a processor 610 and a memory 612 and a communication circuitry 614 comprising at least one of a radio frequency circuitry, a wifi circuitry, and a cellular communication circuitry 614. The central portion of the airframe 110 has at least one of an upper extender mechanism 114 and a lower extender mechanism 124.

A second pair of rotors 118 may be folded outward with the pivot 204 of an undercarriage 116 in a manner such that the second pair of rotors 118 extend substantially perpendicularly to a first pair of rotors 104, such that a first rotor 106 may be substantially perpendicular a third rotor 120 and/or a second rotor 108 may be substantially perpendicular a fourth rotor 122 when in an extended mode 300. The first pair of rotors 104 comprising of the first rotor 106 and the second rotor 108 may be physically enclosed in the airframe 102. The undercarriage 116 may be mechanically coupled on a lower side 202 of the airframe 102. The second pair of rotors 118 comprising of the third rotor 120 and the fourth rotor 122 may be mechanically coupled to the undercarriage 116. The second pair of rotors 118 may be folded underneath the first pair of rotors 104 such that the first pair of rotors 104 and the second pair of rotors 118 are substantially parallel to each other in a folded mode of the undercarriage 116 of the quadcopter 100.

The first pair of rotors 104 may be substantially above the second pair of rotors 118 in the folded mode, such that the first rotor 106 is substantially above the third rotor 120 and the second rotor 108 is substantially above the fourth rotor 122 when in the folded mode. The second pair of rotors 118 may fold outward with the pivot 204 of the undercarriage 116 in the manner such that the second pair of rotors 118 extend substantially perpendicularly to the first pair of rotors 104, such that the first rotor 106 is substantially perpendicular the fourth rotor 122 and the second rotor 108 is substantially perpendicular the third rotor 120 when in the extended mode 300. The second pair of rotors 118 may be extended substantially perpendicularly to the first pair of rotors 104 through a quarter turn of a central axis 402 of the quadcopter 100 coupling the airframe 102 to the undercarriage 116. The quarter turn may pivot 204 the second set of rotors to the extended mode 300. The quadcopter 100 may enter a flyable condition 400 when in the extended mode 300.

An electronic circuitry 408 of the quadcopter 100 may be automatically enabled when in the flyable condition 400. The undercarriage 116 may wrap around the lower extender mechanism 124 in a manner such that the lower extender mechanism 124 is enclosed by the undercarriage 116. The maximum payload capacity may be between one and twenty pounds. A cavity 602 may be encompassed in the central portion in which a securing means 606 to provide for convenient insertion and/or ejection of a battery 608 powering the quadcopter 100 when a cover 604 of the upper extender mechanism 114 is removed. The set of payload extensions may include a hook assembly 506C, an interlocking building block platform assembly 506A, a DSLR camera assembly, a HD camera assembly 506D, and/or a container assembly 506B. A pair of fan-out payload extensions 404 may span out from opposing faces of the undercarriage 116 to provide tensile strength during a landing of the quadcopter 100. A built-in camera 406 may be included in an encasing of at least one of the first rotor 106 and the second rotor 108 of the quadcopter 100. A return home button 112 may autonomously direct the quadcopter 100 to a predetermined location.

In yet another embodiment, a quadcopter 100 includes an airframe 102 and a central portion of the airframe 110 having an upper extender mechanism 114 and a lower extender mechanism 124. The central portion includes a connection means 502 that enables users of the quadcopter 100 to design payload extensions that mechanically couple with the quadcopter 100 using a three-dimensional (3D) printing device in conformance with the connection means 502 as long as the payload extensions have a weight of at least one of a weight less than a maximum payload capacity of the quadcopter 100 and a weight equal to the maximum payload capacity of the quadcopter 100. A second pair of rotors 118 folds underneath a first pair of rotors 104 such that the first pair of rotors 104 and the second pair of rotors 118 are substantially parallel to each other in a folded mode of the quadcopter 100.

FIG. 1A is a folded mode top view 150 of a quadcopter 100 in a folded mode 101, according to one embodiment. In particular, FIG. 1A shows the quadcopter 100, an airframe 102, a first pair of rotors 104, a first rotor 106, a second rotor 108, a central portion of the airframe 110, a return home button 112, and an upper extender mechanism 114. In one embodiment, the airframe 102 may be made of carbon fiber, plastic, a polymer substance with sufficient rigidity to provide structural support, and/or rubber. The airframe 102 may be composed of injection molded plastic and/or 3D printed plastic. The airframe 102 may have a rubber lining (e.g., a bumper) covering the external horizontal edge of the airframe 102. This may enable the quadcopter 100 to come into contact with objects without causing damage and/or marking (e.g., scuffing) of the quadcopter 100 and/or objects.

In one embodiment, the airframe 102 of the quadcopter 100 may be in the shape of a peanut, a circle, a square, a triangle, and/or another shape. The airframe 102 may physically enclose a first pair of rotors 104 comprising a first rotor 106 and a second rotor 108. The rotors (e.g., the first rotor 106, the second rotor 108, a third rotor 120, and/or a fourth rotor 122) may be composed of plastic, carbon fiber, metal, and/or a polymer material. The rotors may be the same size or different sizes. In one embodiment, the rotors (e.g., the first rotor 106 and the second rotor 108) may be 7-12 inch rotors. The rotors may be any size necessary to attain flight (e.g., lift and/or sustained flight).

The first pair of rotors 104 may be substantially above and/or parallel with a second pair of rotors 118 (shown in FIG. 1B) when the quadcopter 100 is in the folded mode 101 of an undercarriage 116 (shown in FIG. 1B), such that the first rotor 106 is substantially above a third rotor 120 and the second rotor 108 is substantially above a fourth rotor 122. The central portion of the airframe 110 may contain the upper extender mechanism 114 and/or a lower extender mechanism 124 (shown in FIG. 1B). The upper extender mechanism 114 and/or lower extender mechanism 124 may be physically coupled with the central portion of the airframe 110 using a screw mechanism, a clipping mechanism, and/or another locking mechanism.

Figure 5:
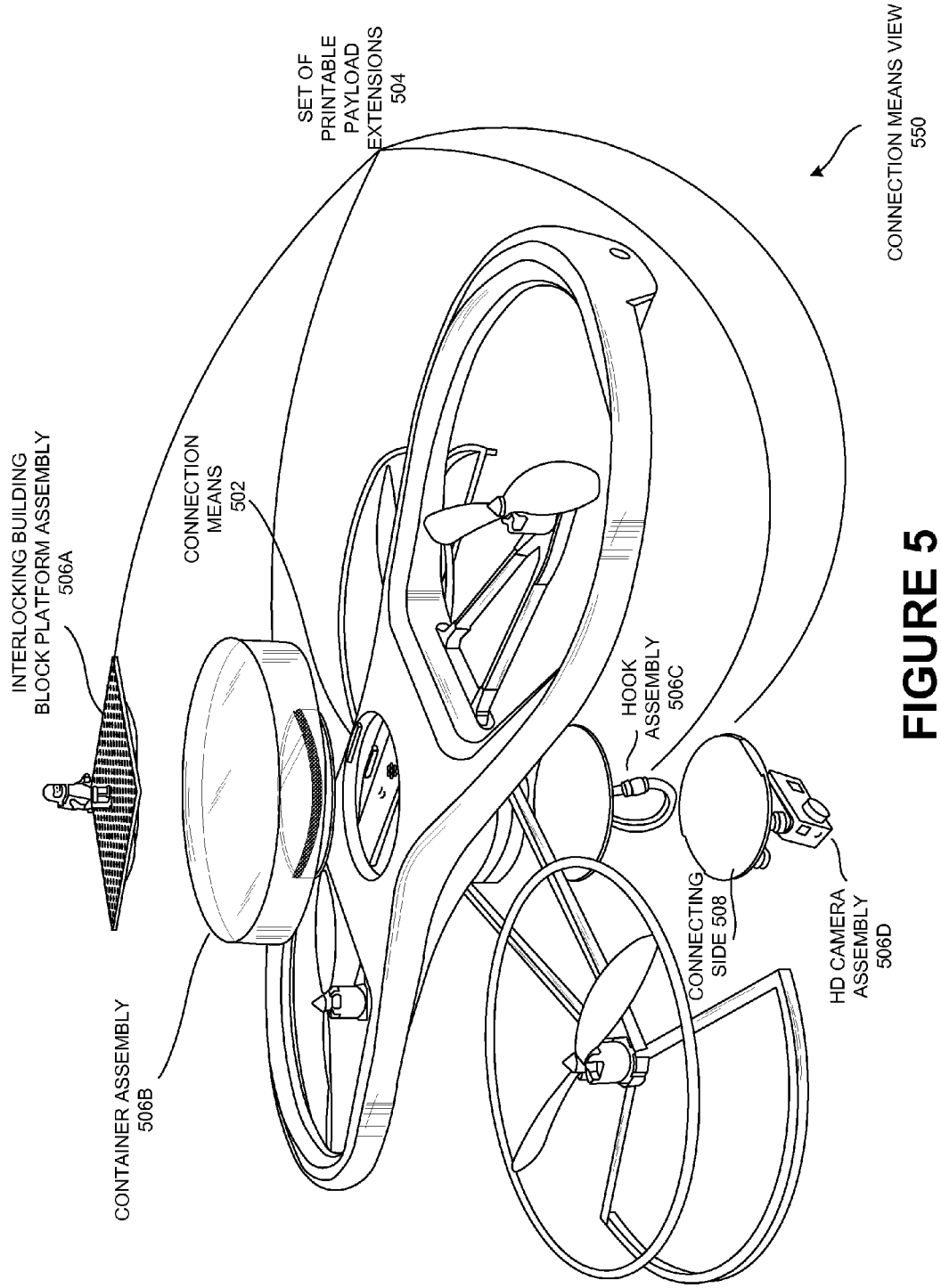
FIG. 5 is a connection means view of multiple assemblies of the quadcopter, according to one embodiment.

The upper extender mechanism 114 and/or the lower extender mechanism 124 may enable a user to mechanically attach a printed payload extension (as shown in FIG. 5). The extender mechanisms may be able to accommodate payload extensions (e.g., custom printed extensions, three-dimensionally printed extensions, and/or extensions manufactured through other means (e.g., injection molding)) as long as the payload extensions have a connecting side (shown in FIG. 5) compatible with the connection means 502 of the extender mechanism(s). In one embodiment, the cover 604 may have a connecting side with the proper (e.g., compatible) connection means (e.g., securing means 606 of FIG. 6) to couple with the connection means 502 of the upper extender mechanism 114 and/or lower extender mechanism 124.

The airframe 102 may include a return home button 112 (e.g., a depress-able button and/or a selection on a screen interface). The return home button 112 may enable a user of the quadcopter 100 to send the quadcopter 100 back to a predetermined location (e.g., the location from where it was sent, a home location, a pre-designated location, and/or a location of the user who sent the quadcopter 100 to its current location). This may enable a lost quadcopter 100 to be easily returned to a secure location and/or may enable a recipient of a delivery of the quadcopter 100 to return the quadcopter 100 quickly and easily. The quadcopter 100 may also include a screen (e.g., a touch screen and/or a display screen) to enable user interaction and/or show details about the quadcopter 100, its owner, its task (e.g., delivery), and/or functional status.

Figure 1B:
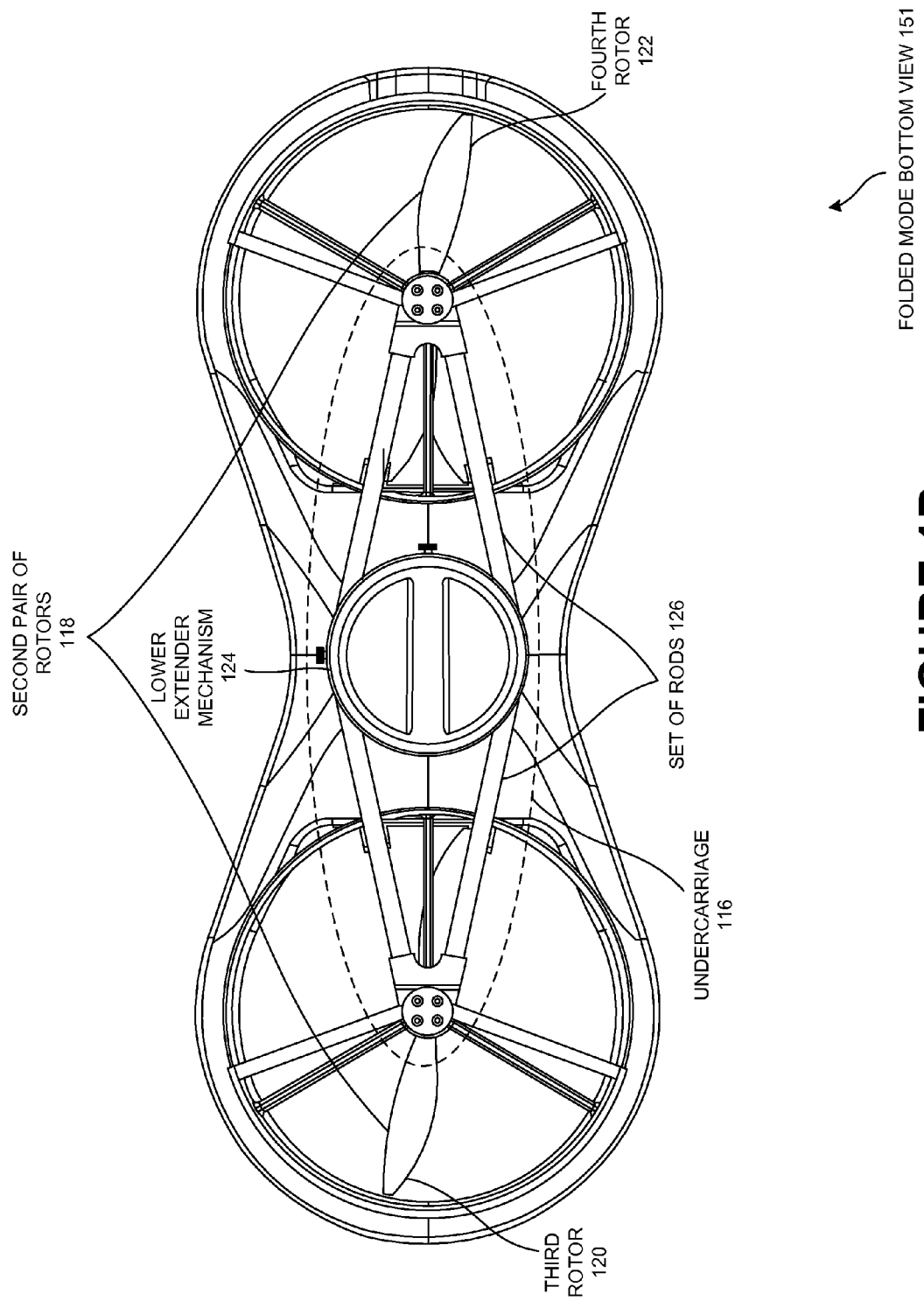
FIG. 1B is a folded mode bottom view of the quadcopter of FIG. 1A in the folded mode, according to one embodiment.

FIG. 1B is a folded mode bottom view 151 of the quadcopter 100 in the folded mode 101, according to one embodiment. Particularly, FIG. 1B shows an undercarriage 116, a second pair of rotors 118, a third rotor 120, a fourth rotor 122, a lower extender mechanism 124, and a set of rods 126. The undercarriage 116 may be physically associated with the airframe 102. The set of rods 126 (e.g., carbon fiber rods and/or plastic rods) may be connected with the lower extender mechanism 124 and/or at least one of the second pair of rotors 118, at least one of a pair of fan-out payload extensions 404 (shown in FIG. 4A), and/or a motor of at least one of the rotors (e.g., the third rotor 120 and/or the fourth rotor 122).

In one embodiment, the second pair of rotors 118 may be substantially underneath and/or parallel to the first pair of rotors 104 when the quadcopter 100 is in the folded mode 101 of the undercarriage 116. The third rotor 120 may be substantially underneath and/or parallel to the first rotor 106 and/or the fourth rotor 122 may be substantially underneath and/or parallel to the second rotor 108 when the undercarriage 116 is in the folded mode 101.

Figure 2:
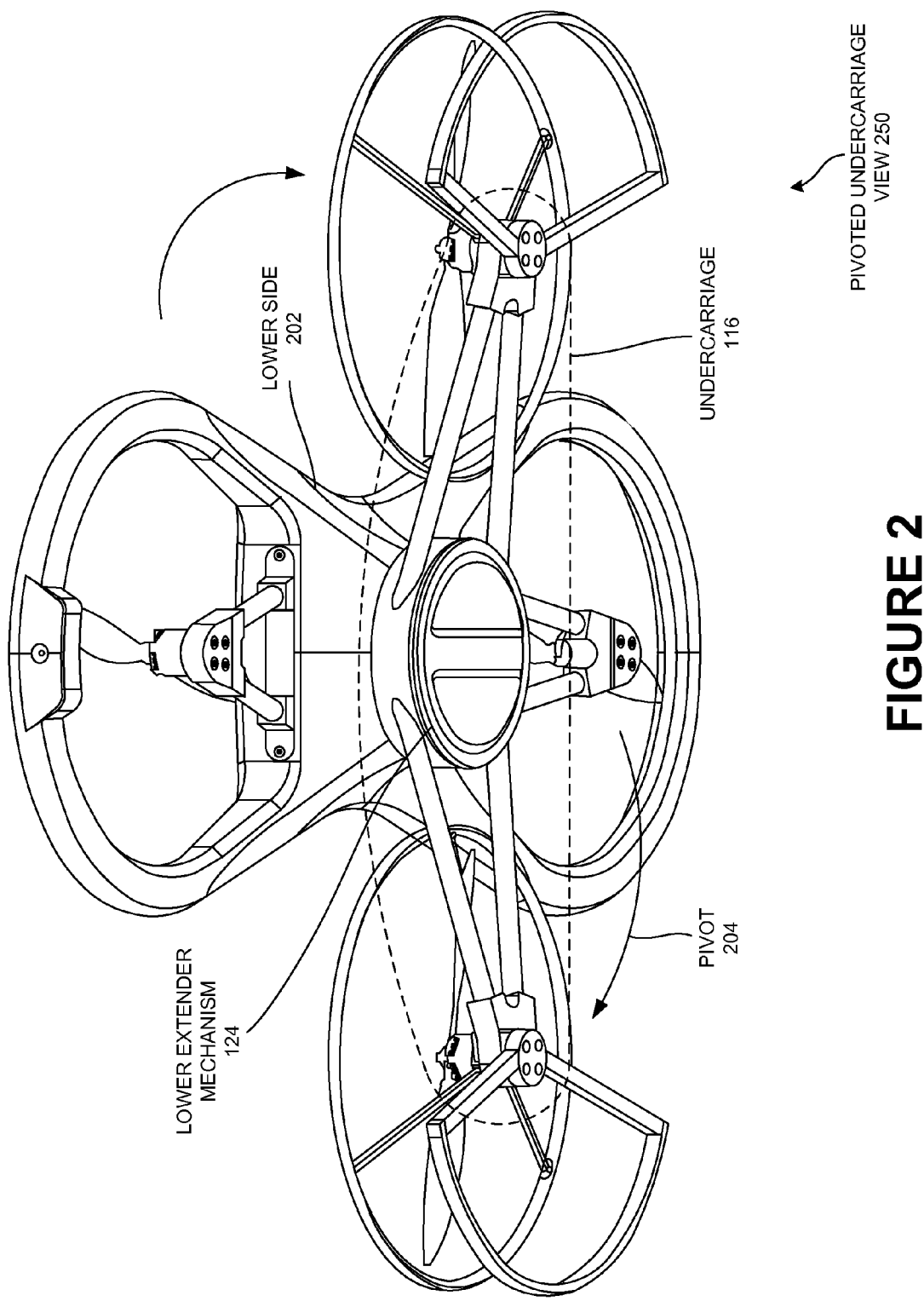
FIG. 2 is a pivoted undercarriage view of the quadcopter, according to one embodiment.

FIG. 2 is a pivoted undercarriage view 250 of the quadcopter 100 in an extended mode 300, according to one embodiment. In particular, FIG. 2 depicts a lower side 202 of the quadcopter 100 and a pivot 204. The undercarriage 116 may be couple with the lower side 202 of the quadcopter 100 (e.g., the lower side 202 of the airframe 102). In one embodiment, the second pair of rotors 118 may fold outward when the undercarriage 116 is pivoted. The pivot 204 may be a quarter (e.g., 90 degree) turn on a horizontal plane. The lower extender mechanism 124 and/or a portion of the lower extender mechanism 124 may act as a turning ring, enabling the pivot 204 via a spring lock mechanism. The spring lock mechanism (e.g., a spring pin and/or a ball detent) may include stoppers placed at a 90 degree angle from one another in order to prevent 360 degree rotation. The lower extender mechanism 124 may only be able to rotate in a predetermined manner (e.g., clockwise to pivot 204 the second pair of rotors 118 outward and/or counterclockwise to pivot 204 the second pair of rotors 118 back inward, thereby pivoting the undercarriage 116 back into the folded mode 101). The spring lock mechanism may require the application of a downward force (e.g., a pull) and/or torque in order to move the second pair of rotors 118 (e.g., the third rotor 120 and/or the fourth rotor 122) outward.

In another embodiment, the third rotor 120 and/or fourth rotor 122 may be folded outward without a pivot 204. Each rotor of the second set of rotors may be independently moved outward and/or inward. The third rotor 120 and/or fourth rotor 122 may be connected to extending means (e.g., telescoping arms) that may enable the rotors to be moved from a folded position (e.g., under the airframe and/or first set of rotors). In another embodiment, the third rotor 120 and/or fourth rotor 122 may extend outward from an airframe of the quadcopter 100 through a sliding mechanism in which the angle between the coupled points of two or more arms coupled with the rotor (e.g., directly or indirectly coupled) is decreased as the rotors extend outward from the airframe.

Figure 3:
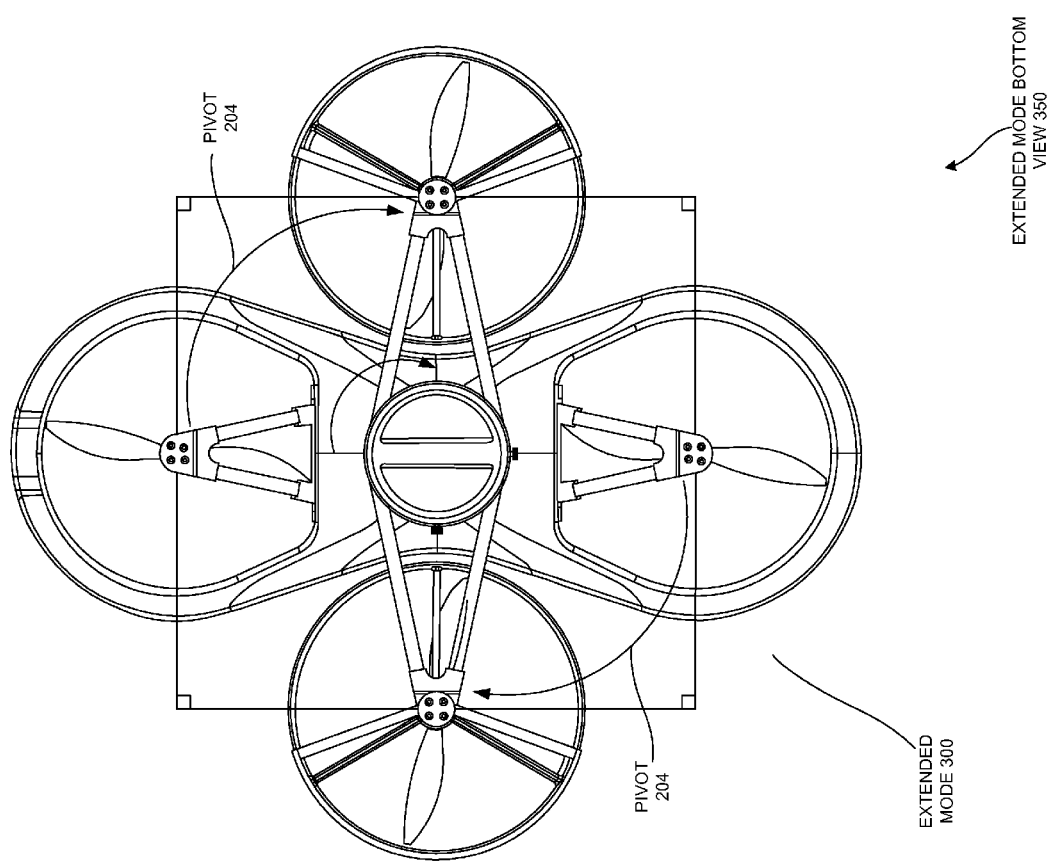
FIG. 3 is an extended mode bottom view of the quadcopter of FIG. 2 in an extended mode, according to one embodiment.

FIG. 3 is an extended mode 300 bottom view 350 of the quadcopter 100 in an extended mode 300. When the undercarriage 116 is in the extended mode 300 (e.g., when the second pair of rotors 118 have been folded outward with the pivot 204 of the undercarriage 116) the first pair of rotors 104 may be substantially perpendicular to the second pair of rotors 118. The first rotor 106 may be substantially perpendicular to (e.g., at a 90 degree angle in relation to) the third rotor 120 and/or the fourth rotor 122 when the quadcopter 100 is in the extended mode 300 of the undercarriage 116.

The second rotor 108 may be substantially perpendicular to the third rotor 120 and/or the fourth rotor 122 when the quadcopter 100 is in the extended mode 300 of the undercarriage 116.

Figure 4A:
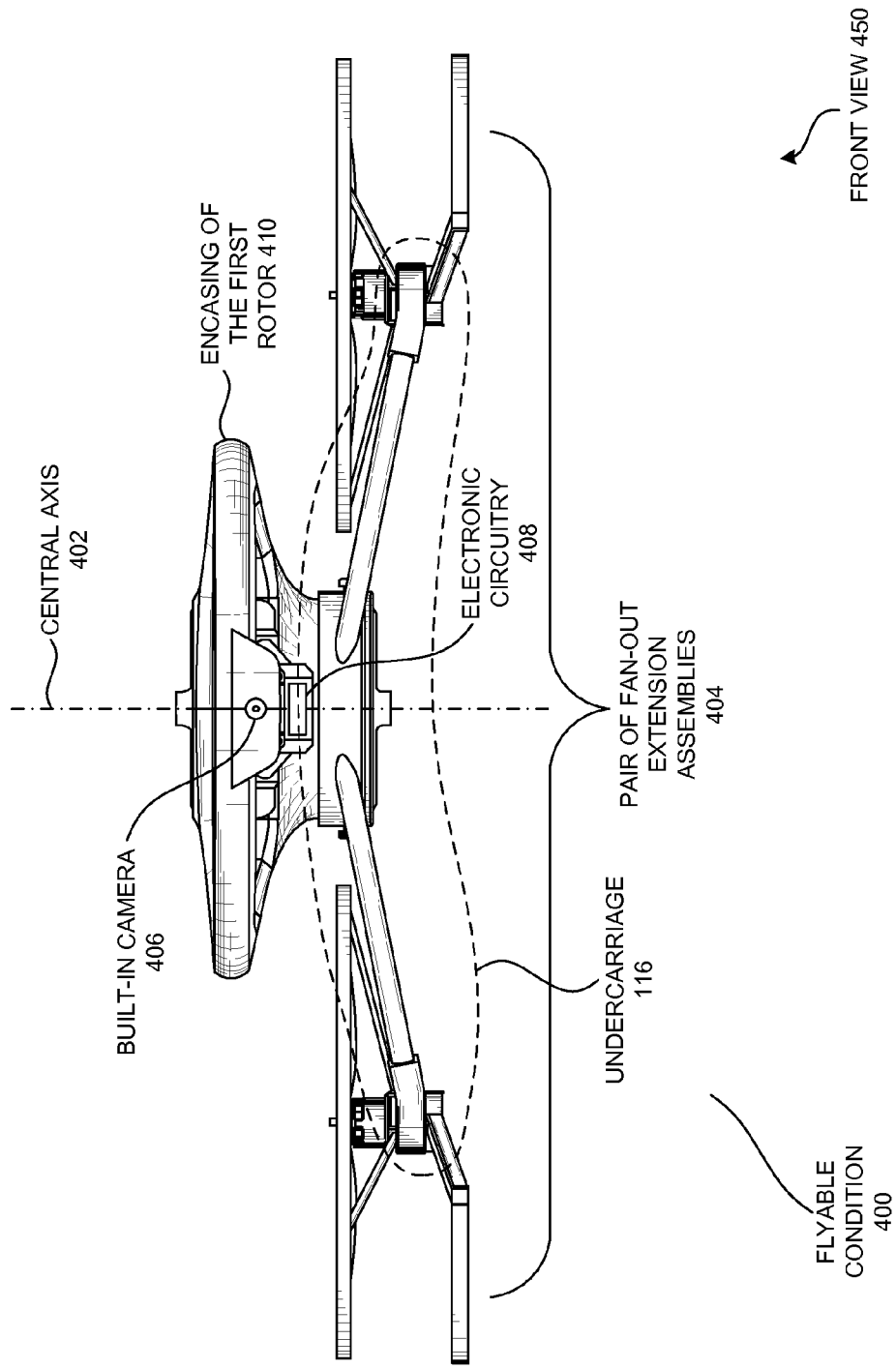
FIG. 4A is a front view of the quadcopter of FIG. 2 in a flyable condition, according to one embodiment.

FIG. 4A is a front view 450 of the quadcopter 100 in a flyable condition 400. FIG. 4A shows the flyable condition 400, a central axis 402, a pair of fan-out payload extensions 404, a built-in camera 406, an electronic circuitry 408, an encasing of the first rotor 410 106. The quadcopter 100 may enter a flyable condition 400 when the second pair of rotors 118 extend outward with the pivot 204 of the central axis 402 of the quadcopter 100 (e.g., when the quadcopter 100 is in the extended mode 300). In one embodiment, an electronic circuitry 408 may be automatically enabled when the quadcopter 100 enters the flyable condition 400. The quadcopter 100 may automatically "turn on" when in the flyable condition 400.

The pair of fan-out payload extensions 404 may be coupled with the undercarriage 116 in a manner in which the pair of fan-out payload extensions 404 span out from ends of the undercarriage 116 and/or under each rotor of the second pair of rotors 118. The fan-out payload extensions may provide support for the quadcopter 100 when landing and/or resting on a surface. The fan-out payload extensions may be substantially under and/or parallel to prop guards of the second pair of rotors 118, such that the fan-out payload extensions do not protrude outward from a structural profile of the quadcopter 100 when in the extended mode 300 and/or the folded mode 101. In one embodiment, a surface of the fan-out payload extensions 404 that comes in contact with the landing and/or resting surface may consist of a gripping material and/or pattern (e.g., tredded rubber).

The airframe 102 may include the built-in camera 406. In the embodiment of FIG. 4A, the built-in camera 406 is shown as being included in the encasing of the first rotor 410. The built-in camera 406 may be in another location in and/or on the airframe and/or the airframe may include multiple built-in cameras 406. In one embodiment, the built-in camera 406 may have a single lens or multiple lenses. The built-in camera 406 may be capable of taking video and/or pictures, being rotated, panned, and/or may be able to zoom in and/or out. The airframe and/or built-in camera 406 may have and/or be couple with a stabilization mechanism (e.g., a shock absorber, an integrated camera tilt motor) which may automatically compensate for the quadcopter's 100 motion and/or ensure smooth and/or optimal camera operation.

In one embodiment, the built-in camera 406 may use its own battery and/or memory and/or use the battery 608 and/or memory 612 of the quadcopter 100. A USB port and/or other data transfer means may be located on the quadcopter 100 to enable video and/or pictures captured by the built-in camera 406 to be accessed directly from the quadcopter 100. Video and/or pictures captured by the built-in camera 406 may to capable of being communicated (e.g., using wifi, 3G and/or 4G) in real time and/or upon request to a user device (e.g., a computer, a smart phone, a tablet, and/or a data processing system).

Figure 4B:
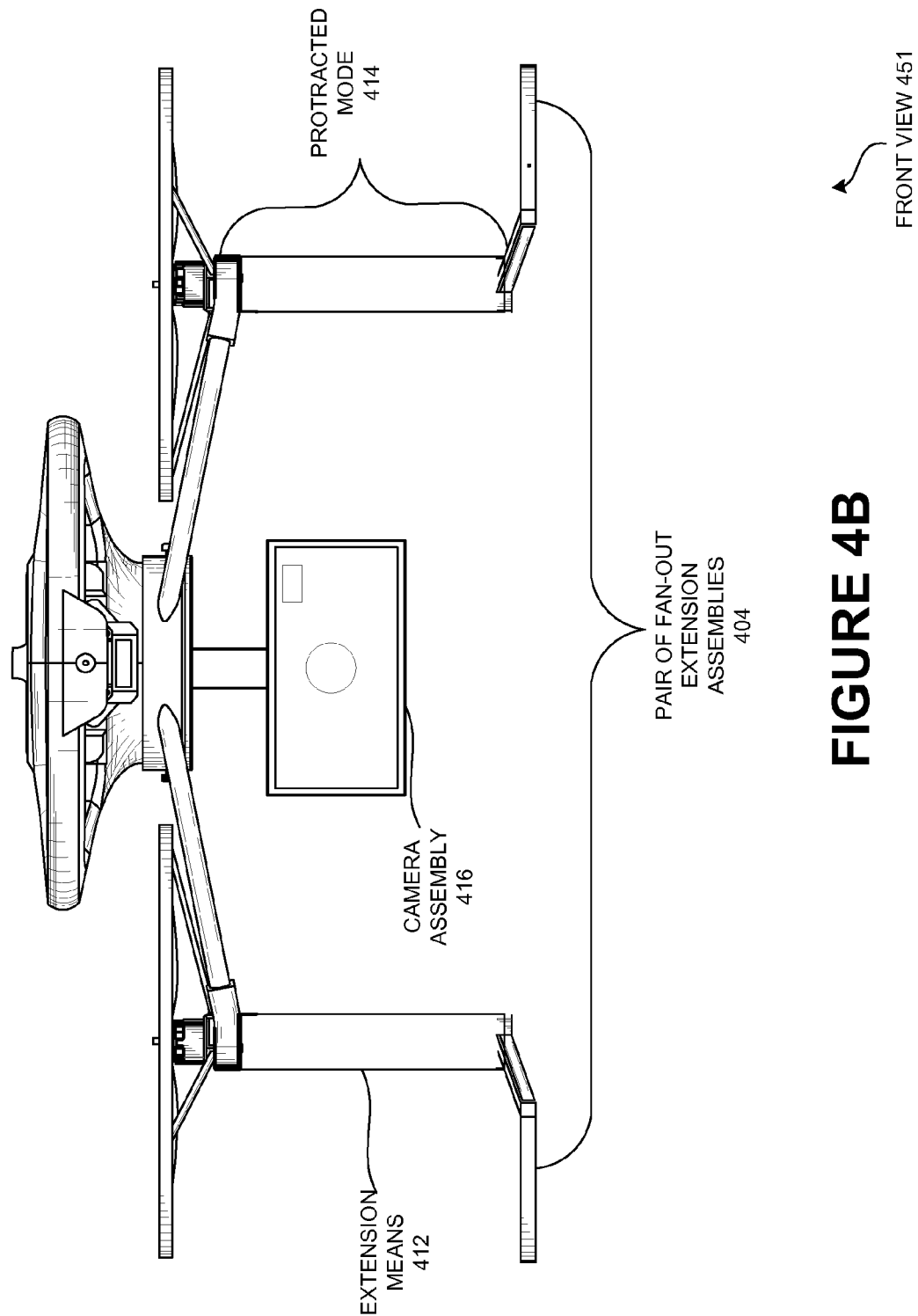
FIG. 4B is a front view of the quadcopter of FIG. 4A with a pair of fan-out payload extensions in a protracted mode, according to one embodiment.

FIG. 4B is a front view 451 of the quadcopter of FIG. 4A with the pair of fan-out payload extensions in a protracted mode, according to one embodiment. Particularly, FIG. 4B shows an extension means 412, a protracted mode 414, and a camera assembly 416. The pair of fan-out payload extensions 404 may have (e.g., include, be coupled with, be associated with, and/or work in concert with) extension means 412 which may lower and/or raise at least one of the fan-out payload extensions. In one embodiment, the pair of fan-out payload extensions 404 may extend down in order to enable the quadcopter 100 to land without causing a payload extension that is attached with the lower extender mechanism 124 to come into contact with a landing surface (e.g., the ground).

In one embodiment, the extension means 412 may extend the at least one of the pair of fan-out extension assemblies 404 by way of a telescoping mechanism, a sliding mechanism, and/or a folding mechanism in which the pair of fan-out extension assemblies 404 may fold from a position parallel to the landing surface to a perpendicular position in relation to the landing surface. The quadcopter 100 may have multiple detachable fan-out extension assemblies. In one embodiment, the user may be able to attach an extension piece to the quadcopter (e.g., between the at least one of the motor, propeller guard, rotor, and/or airframe and the at least one of the pair of fan-out extension assemblies 404), fixing the at least one of the pair of fan-out extension assemblies 404 a distance away from the undercarriage 116 that enables the at least one of the pair of fan-out extension assemblies 404 to physically contact the landing surface without the payload extension attached to the lower extender mechanism 124 coming into contact with the landing surface.

The pair of fan-out payload extensions 404 may enter a contracted mode while the quadcopter is in flight and/or may enter a protracted mode 414 while in the process of landing (e.g., following the selection of a landing feature on a user device, upon receipt of landing instructions by the quadcopter, and/or when below a threshold altitude). In one embodiment, the extension means 412 may extend at least one of the pair of fan-out payload extensions 404 to a predetermined (e.g., by the user and/or the manufacturer) distance from the motor, prop guard, rotor, and/or airframe the at least one of the pair of fan-out payload extensions 404 is located under. In another embodiment, the quadcopter may use sensors to determine an appropriate distance to lower the at least one of the pair of fan-out payload extensions 404 in order to accommodate the payload extension (e.g., the camera assembly 416 shown in FIG. 4B) attached to the lower extender mechanism 124.

FIG. 5 is a connection means view 550 of a set of printable payload extensions 504 capable of being physically associated with the quadcopter 100, according to one embodiment. Particularly, FIG. 5 shows a connection means 502 and the set of printable payload extensions 504 (e.g., payload extensions) including an interlocking building block platform assembly 506A, a container assembly 506B, a hook assembly 506C, and an HD camera assembly 506D. The upper extender mechanism and/or the lower extender mechanism 124 may include a connection means (e.g., the connection means 502) that enables users of the quadcopter 100 to attach (e.g., lock, affix, mechanically couple, and/or connect) payload extensions to the quadcopter 100.

In one embodiment, the payload extensions may be created using three-dimensional (3D) printing. This may enable users to design and/or create custom printable payload extensions and/or attach the set of printable payload extensions 504 to the quadcopter 100 using the connection means 502, as long as a connecting side 508 of the printable assembly is compatible with the connection means 502 (e.g., has a specified size and/or complementary connection mechanism that acts as a mechanical coupling partner (e.g., male and/or female end) with the connection means 502). Users may be able to create any printable assembly (e.g., printable payload extension) they wish as long as certain criteria are met. For example, the printable assembly and/or contents may be required to be under a threshold weight and/or size, may not be allowed to extend a certain distance past the airframe and/or cover one or more rotors, may need to meet certain safety standards, and/or may need to have a connecting side 508 that meets preset standards (e.g., radius, width, length, composed of certain material, and/or comprising a connection mechanism (e.g., securing means 606) compatible with the connection means 502).

The hook assembly may enable users to attach items to the quadcopter 100 (e.g., hook a sweatshirt to be transported) and/or may enable the quadcopter 100 to hook (e.g., pick up) items without users having to physically attach the items to the hook mechanism of the hook assembly. In one embodiment, a battery assembly may be included in the set of printable payload extensions 504. The battery assembly may be connected using the connection means 502 and/or may include circuitry to enable a battery of the battery assembly to power the quadcopter 100. The battery assembly may work in concert with a battery 608 of the quadcopter 100 (shown in FIG. 6) and/or the battery 608 and the battery of the battery assembly may be used individually (e.g., the battery of the battery assembly may be used after the battery 608 of the quadcopter 100 has reached a threshold level of charge). The set of printable payload extensions 504 may include any printable assembly capable of being conceived and/or created, provided a number of the abovementioned criteria are met.

Figure 6:
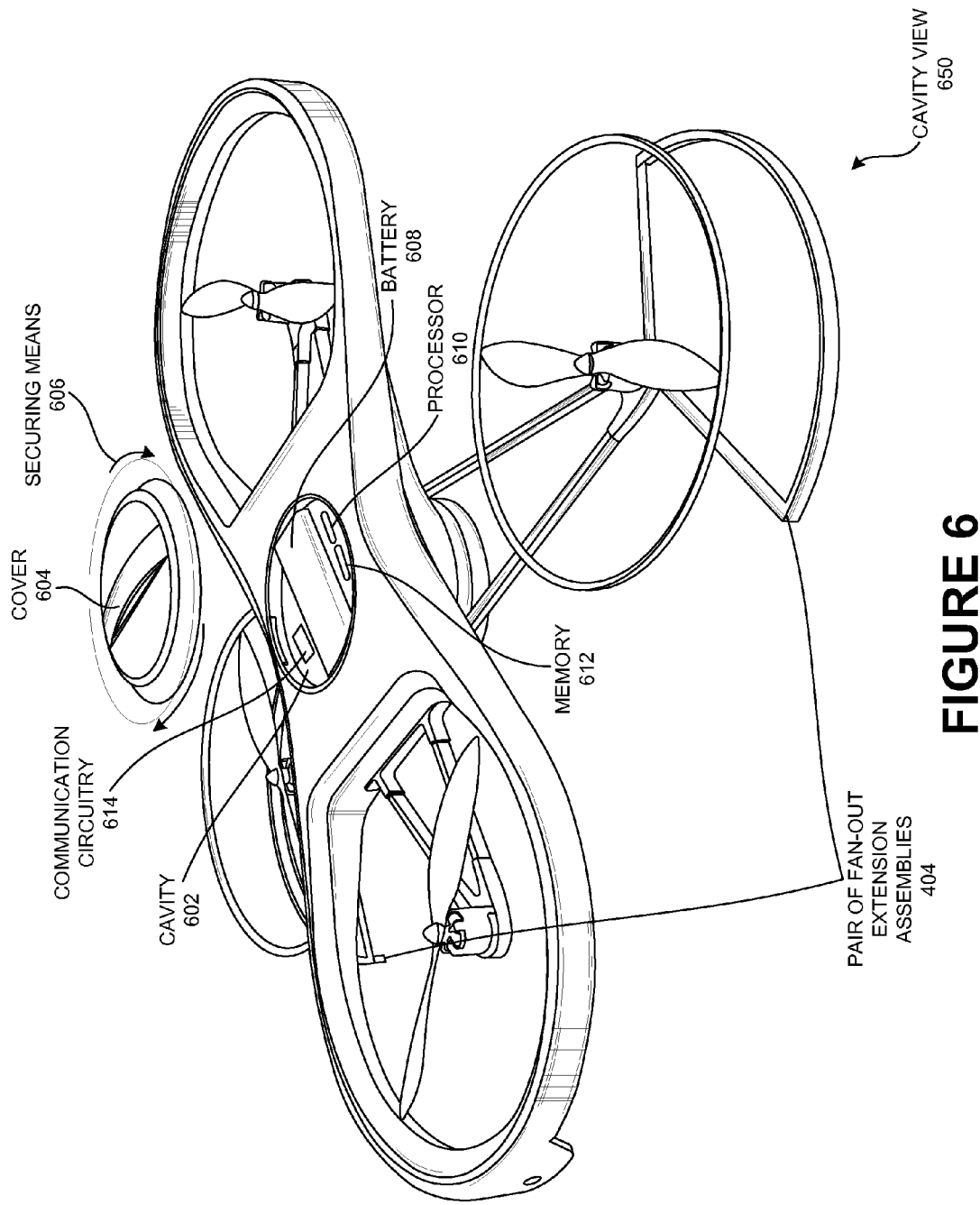
FIG. 6 is a cavity view of the quadcopter, according to one embodiment.

FIG. 6 is a cavity view 650 of the quadcopter 100. FIG. 6 shows a cavity 602, a cover 604, a securing means 606, a battery 608, a processor 610, a memory 612, and a communication circuitry 614. In one embodiment, the central portion may contain the cavity 602 which may include the battery 608, the processor 610, the memory 612, and/or the communication circuitry 614. The securing means 606 may secure the cover 604 (e.g., a cover of the upper extender mechanism 114 and/or the lower extender mechanism 124) over the cavity 602. In one embodiment, the cover 604 may be separate from the upper extender mechanism 114 and/or the lower extender mechanism 124. The cover 604 may facilitate fast, easy, and/or convenient insertion and/or ejection of the battery 608 powering the quadcopter 100.

The cavity 602 may include the processor 610 and/or the memory 612. In one embodiment, the cavity 602 may include the communication circuitry 614 which may enable the quadcopter 100 to communicate with a server, data processing device, smart phone, and/or computer. The communication circuitry 614 may include a radio frequency circuitry, a wifi circuitry, and/or a cellular communication circuitry. In one embodiment, the communication circuitry 614 may enable audio and/or visual data (e.g., photographs and/or video) from the built-in camera 406, a microphone assembly, and/or a camera assembly (e.g., the HD camera assembly 506D) to be communicated to the user, the server, and/or the data processing system upon request and/or in real time.

The cavity 602 may also include a sensory fusion circuitry and/or a sensory fusion algorithm of a motherboard of the quadcopter 100. In one embodiment, the sensory fusion algorithm and/or sensory fusion circuitry may use input from one or more sensors of the quadcopter 100 (e.g., an ultrasound sensor, a radio frequency sensor, a laser sensor, a radar sensor, an optical sensor, a stereo optical sensor, a global positioning device and/or sensor, and/or a LIDAR sensor) to enable the quadcopter 100 to operate autonomously. In an example embodiment, the quadcopter 100 may be able to autonomously return to a predetermined location using the sensory fusion circuitry, sensory fusion algorithm, and/or at least one sensor when the return home button 112 is selected.

An example embodiment will now be described. In one embodiment, Ben may have several children with different interests. Ben may wish to use a quadcopter in order to film his youngest daughter's soccer matches. Ben's oldest daughter may wish to use the quadcopter for recreational flying and may not want accessories to complicate her flight maneuvers. Ben's youngest child, his son, may wish to create building block creations and include the quadcopter in his play time. Ben's wife may have use of the quadcopter for sending and/or receiving deliveries to and/or from her neighbors.

Quadcopters may not be able to fulfill these diverse needs and/or accessories may be complicated (e.g., requiring the attachment and a securing means and/or alterations to the quadcopter) and/or unavailable. Ben may not be able to afford to purchase separate quadcopters for each family member. Ben may see a neighbor using a Skyteboard™ quadcopter and may purchase one of his own. The Skyteboard™ quadcopter may enable him to create and/or safely use any attachment he or a member of his family wishes.

Ben may be able to create a camera assembly (e.g., an assembly with its own camera and/or an assembly to enable Ben to attach a camera to the quadcopter) and film is daughter's soccer matches. This may enable neighbors, parents of team members, and/or Ben's relatives to view the video (e.g., live and/or at a later time). Ben's oldest daughter may be able to fly the Skyteboard™ quadcopter without any accessories and/or may be able to create and/or use an extra battery attachment to enable her to fly the Skyteboard™ quadcopter for longer continuous periods of time. Ben's wife may be able to create various container assemblies to safely and securely transport items (e.g., tools, presents, and/or food items) to and/or from neighbors. Ben's son may be able to create Lego™ assemblies and/or seats so his favorite stuffed animal may ride ("pilot") the Skyteboard™ quadcopter. The Skyteboard™ quadcopter may enable Ben's family to get the most out of their purchase and may fuel creativity while bringing new excitement to family time.

Although the present embodiments have been described with reference to specific example embodiments, it will be evident that various modifications and changes may be made to these embodiments without departing from the broader spirit and scope of the various embodiments. It will be appreciated that the various mechanical assemblies described herein may be created using a variety of materials, chemistries, sizes, forms, and compositions. In addition, it will be appreciated that some of the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A quadcopter, comprising:
  an airframe;
  a central portion of the airframe having at least one of an upper extender mechanism and a lower extender mechanism,
  wherein the central portion enables users of the quadcopter to design payload extensions that mechanically couple with the quadcopter using a three-dimensional (3D) printing device as long as the payload extensions have a weight of at least one of a weight less than a maximum payload capacity of the quadcopter and a weight equal to the maximum payload capacity of the quadcopter, wherein a second pair of rotors folds underneath a first pair of rotors such that the first pair of rotors and the second pair of rotors are substantially parallel to each other in a folded mode of the quadcopter, wherein the first pair of rotors further comprises of a first rotor and a second rotor physically enclosed in the airframe, wherein an undercarriage is mechanically coupled on a lower side of the airframe, wherein the second pair of rotors further comprises of a third rotor and a fourth rotor mechanically coupled to the undercarriage, wherein the first pair of rotors are substantially above the second pair of rotors in the folded mode, such that the first rotor is substantially above the third rotor and the second rotor is substantially above the fourth rotor when in the folded mode, wherein the second pair of rotors fold outward with the pivot of the undercarriage in the manner such that the second pair of rotors extend substantially perpendicularly to the first pair of rotors, such that the first rotor is substantially perpendicular to the fourth rotor and the second rotor is substantially perpendicular to the third rotor when in an extended mode, wherein the second pair of rotors fold outward with the pivot of the undercarriage in the manner such that the second pair of rotors extend substantially perpendicularly to the first pair of rotors, such that the first rotor is substantially perpendicular to the third rotor and the second rotor is substantially perpendicular to the fourth rotor when in the extended mode, wherein the quadcopter couples at least one of a set of payload extensions including a hook assembly, an interlocking building block platform assembly, a DSLR camera assembly, a HD camera assembly, and a container assembly through the central portion of the airframe, wherein the second pair of rotors extend substantially perpendicularly to the first pair of rotors through a quarter turn of a central axis of the quadcopter coupling the airframe to the undercarriage, wherein the quarter turn to pivot the second set of rotors to the extended mode, wherein the quadcopter enters a flyable condition when in the extended mode, wherein the quadcopter automatically enables an electronic circuitry of the quadcopter when in the flyable condition, and wherein the undercarriage wraps around the lower extender mechanism in a manner such that the lower extender mechanism is enclosed by the undercarriage.

2. The quadcopter of claim 1:
wherein the maximum payload capacity is between one and twenty pounds.

3. The quadcopter of claim 2:
wherein the central portion to encompass a cavity in which a securing means to provide for convenient insertion and ejection of a battery powering the quadcopter when a cover of the upper extender mechanism is removed.

4. The quadcopter of claim 3:
wherein the cavity to include a processor and a memory and a communication circuitry comprising at least one of a radio frequency circuitry, a wifi circuitry, and a cellular communication circuitry.

5. The quadcopter of claim 4:
wherein a pair of fan-out payload extensions span out from opposing faces of the undercarriage to provide tensile strength during a landing of the quadcopter, wherein the airframe of the quadcopter to include a built-in camera in an encasing of at least one of the first rotor and the second rotor of the quadcopter, and wherein the airframe to include a return home button to autonomously direct the quadcopter to a predetermined location.

* * * * *